United States Patent
Roth (10) Patent No.: US 12,271,778 B2
(45) Date of Patent: Apr. 8, 2025

(54) RFID MONITORING SYSTEMS AND METHODS

(71) Applicant: Avery Dennison Retail Information Services LLC, Mentor, OH (US)

(72) Inventor: Mark W. Roth, North Miami, FL (US)

(73) Assignee: Avery Dennison Retail Information Services LLC, Mentor, OH (US)

( * ) Notice: Subject to any disclaimer, the term of this patent is extended or adjusted under 35 U.S.C. 154(b) by 0 days.

(21) Appl. No.: 18/259,497

(22) PCT Filed: Dec. 17, 2021

(86) PCT No.: PCT/US2021/064092
§ 371 (c)(1),
(2) Date: Jun. 27, 2023

(87) PCT Pub. No.: WO2022/146723
PCT Pub. Date: Jul. 7, 2022

(65) Prior Publication Data
US 2024/0062023 A1    Feb. 22, 2024

Related U.S. Application Data (60) Provisional application No. 63/132,453, filed on Dec. 30, 2020.

(51) Int. Cl.
G06K 7/10 (2006.01)
G08B 21/18 (2006.01)

(52) U.S. Cl.
CPC ......... *G06K 7/10366* (2013.01); *G08B 21/18* (2013.01)

(58) Field of Classification Search
CPC .............. G06K 7/10366; G08B 21/18; G06Q 10/087; G06Q 10/0833
See application file for complete search history.

(56) References Cited

U.S. PATENT DOCUMENTS

| | | | |
|---|---|---|---|
| 7,602,288 B2 * | 10/2009 | Broussard | G06K 17/0022 340/572.8 |
| 7,710,275 B2 | 5/2010 | Phillips et al. | |
| 7,752,980 B2 | 7/2010 | Muirhead | |
| 10,565,410 B1 | 2/2020 | Shmulevich et al. | |
| 10,709,521 B2 * | 7/2020 | Hansen | G06K 19/0723 |
| 11,922,251 B2 * | 3/2024 | Roth | G06K 19/025 |
| 2006/0175401 A1 * | 8/2006 | Roberts | G06Q 10/087 235/383 |
| 2007/0126578 A1 * | 6/2007 | Broussard | G06Q 10/087 705/28 |
| 2009/0322490 A1 | 12/2009 | Kung et al. | |
| 2010/0019882 A1 | 1/2010 | Stern et al. | |

(Continued)

FOREIGN PATENT DOCUMENTS

WO    2016/040593    3/2016

OTHER PUBLICATIONS

International Search Report and Written Opinion dated Mar. 11, 2022 issued in corresponding IA No. PCT/US2021/064092 filed Dec. 17, 2021.

*Primary Examiner* — Tuyen K Vo (57) ABSTRACT

In some embodiments, a monitoring system may include an RFID reader mounted to a support structure. The RFID reader may be configured for continuously scanning for RFID tagged items within a field and issuing an alert when an alert condition has been triggered.

8 Claims, 6 Drawing Sheets

(56) References Cited

U.S. PATENT DOCUMENTS

| | | |
|---|---|---|
| 2010/0156651 A1 | 6/2010 | Broer |
| 2013/0098989 A1* | 4/2013 | Salzman ................ G06Q 10/08 |
| | | 235/375 |
| 2014/0361078 A1 | 12/2014 | Davidson |
| 2015/0127362 A1* | 5/2015 | DeBusk .............. G07F 17/0092 |
| | | 705/2 |
| 2018/0157873 A1* | 6/2018 | Roth .................. G06K 7/10366 |
| 2020/0042752 A1* | 2/2020 | Tourdot ............... G06K 7/1097 |

\* cited by examiner

RFID MONITORING SYSTEMS AND METHODS

CROSS-REFERENCE TO RELATED APPLICATION(S)

The present application is a 371 of International Application No. PCT/US2021/064092 which was published in English on Jul. 7, 2022, and claims the benefit of U.S. Provisional Patent Application No. 63/132,453 filed Dec. 30, 2020, both of which are incorporated herein by reference in their entireties.

BACKGROUND

In various industries, it is important to know exactly what items are being moved through a given location, such as for facilitating commerce, shipping, or other purposes. For example, during shipping, some types of items are prohibited from being shipped via commercial air freight. There may be fines associated with shipping batteries, aerosols, paints, or ammunition that may be assessed per incident and may represent tens of thousands of dollars in fines for a single package.

Current shipment methods may involve shipment of multiple items inside a container or on top of a pallet. One way of detecting such items is to use a portal RFID reader that attempts to communicate with multiple RFID tags located inside a container or in a cluster of packages that are fixed to a pallet. Such systems may fail to detect multiple items on the pallet or within the container due to interference, blocking of signals, lack of line of sight, or other issues. For example, metal objects, metal cans, or items containing fluids and/or protein may make reliable detection of all items within a cluster of such items very challenging for conventional systems.

Accordingly, improvements over conventional systems are needed.

SUMMARY

The following presents a simplified summary in order to provide a basic understanding of some aspects of the disclosed innovation. This summary is not an extensive overview, and it is not intended to identify key/critical elements or to delineate the scope thereof. Its sole purpose is to present some concepts in a simplified form as a prelude to the more detailed description that is presented later.

In some embodiments, a monitoring system may include an RFID reader mounted to a support structure. The RFID reader may be configured for continuously scanning for RFID tagged items within a field and issuing an alert when an alert condition has been triggered.

In some embodiments, the monitoring system may include a container disposed within the field of the RFID reader. The alert may be triggered when a prohibited item is detected. The alert may be triggered when a collected set of detected items are removed at the same time and a list of intended items has not been completed. The monitoring system may include a conveyor disposed to deliver items into the container.

In some embodiments, the container may be one of a Gaylord, a pallet, a box, a carton, or a bag. The RFID reader may be mounted at least 5 feet over a target area for supporting containers. The target area may be between 4 and 10 feet wide. The RFID tagged items are each one of the following: a box containing a commercial product, a bag containing a commercial item, a food item, produce, an appliance, a machine component, materials. The alert may include one or more of a visual notification, an audible notification, and an electronic notification.

In some embodiments, a method of operating a monitoring system, may include using an RFID reader, continuously scanning RFID tagged items within a target area as they are added to a container, detecting a triggering condition, and issuing an alert based on the triggering condition.

In some embodiments, the triggering condition may include detection of a prohibited item. The triggering condition may include detection of removal of a group of objects on a list when the list has not yet been completely filled. The RFID tagged items may each be one of the following: a box containing a commercial product, a bag containing a commercial item, a food item, an appliance, a machine component, materials. The alert may include one or more of a visual notification, an audible notification, and an electronic notification. The method may include, using a conveyor, delivering items into the container. The container may be one of a Gaylord, a pallet, a box, a carton, or a bag. The RFID reader may be mounted at least 5 feet over the target area for supporting containers. The target area may be between 4 and 10 feet wide.

To the accomplishment of the foregoing and related ends, certain illustrative aspects of the disclosed innovation are described herein in connection with the following description and the annexed drawings. These aspects are indicative, however, of but a few of the various ways in which the principles disclosed herein can be employed and are intended to include all such aspects and their equivalents. Other advantages and novel features will become apparent from the following detailed description when considered in conjunction with the drawings.

DETAILED DESCRIPTION

The innovation is now described with reference to the drawings, wherein like reference numerals are used to refer to like elements throughout. In the following description, for purposes of explanation, numerous specific details are set forth in order to provide a thorough understanding thereof. It may be evident, however, that the innovation can be practiced without these specific details. In other instances, well-known structures and devices are shown in block diagram form in order to facilitate a description thereof. The terms "one or more of a, b, and c", "at least one of a, b, and c", and "at least one of a, b, or c" are intended to refer to a, b, c, or combinations thereof including 1) one or multiple of a and one or multiple of b, 2) one or multiple of b and one or multiple of c, 3) one or multiple of a and one or multiple of c, 4) one or multiple of a, 5) one or multiple of b, or 6) one or multiple of c.

In some embodiments, a monitoring system is provided for detection of objects and/or detection of a lack of objects that may be more useful, cost effective, and reliable than some other existing systems. In some embodiments, a monitoring system may include a reader that continuously or non-continuously monitors a target area, such as at a location where items are typically accumulated and/or channeled. The reader may be an RFID (Radio Frequency Identification) reader, and the monitoring system may further include a notification system, such as a light and/or a noise emitter.

Figure 1:
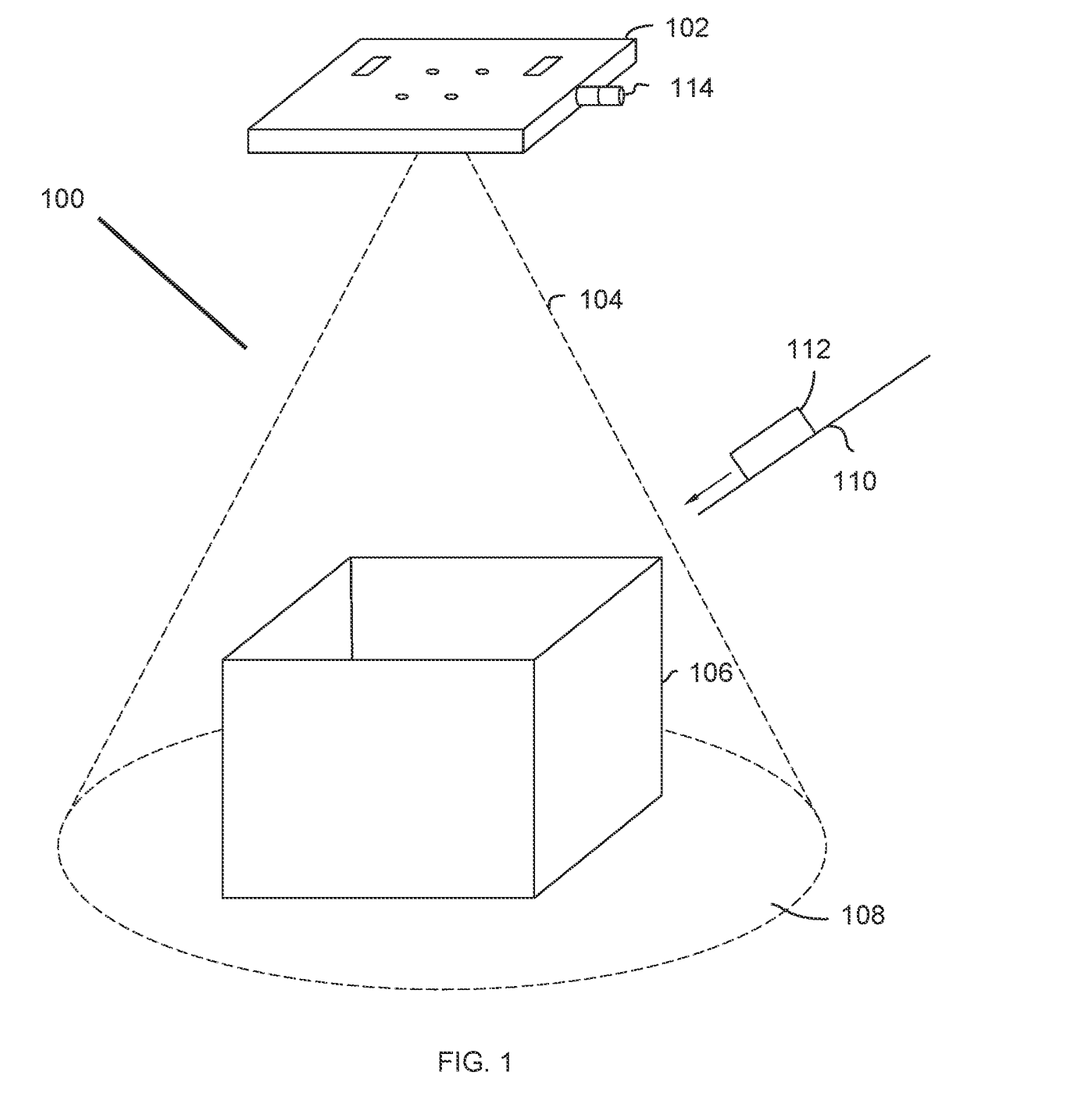
FIG. 1 is a perspective view of a continuous monitoring system in accordance with some embodiments.

In some embodiments, such as in FIG. 1, a monitoring system 100 (e.g., a continuous monitoring system, a triggered monitoring system, or a periodically monitoring system) may include one or more of a reading system 102 (e.g., an RFID reader), a container 106, a conveyor 110, and a notification system 114.

In some embodiments, the reading system 102 may be configured as an overhead reader, which may be mounted to the ceiling, a wall, or other supporting structure. The reading system 102 may be configured to continuously monitor an area 108 and to detect RFID tags that enter its field of detection. The area 108 may be a location for filling or loading a container 106 such as a Gaylord, box, carton, pallet, or bag. In some embodiments, the area 108 may be a location on a conveyor belt.

In various embodiments, the area 108 may be sized to detect objects within a container 106 such as a Gaylord, carton, or pallet. In some embodiments, the area 108 may be sized to fit larger or smaller containers such as shipping containers, moving vans, truck beds, shipping containers, shopping bags, a delivery bag, a food tray, or backpacks. In some embodiments, the area 108 may be focused on an area of traffic, such as at a room or building entrance or exit, or a changing room. The area 108 may be configured to have a diameter of between 0-1, 1-2, 2-3, 3-4, 4-5, 5-6, 6-8, 8-10, 10-12, 12-14, 14-16, 16-18, 18-20, 20-25, 25-30, 30-40 feet, greater diameters, or combinations of these diameters such as diameters that are between 6-14 feet.

In some embodiments, the reader system 102 may be mounted at a distance of between 6-10 feet away from the area 108, which may be at floor level. In other embodiments, the reader may be disposed at a distance from the area 108, the distance being between 2-3 feet, 3-5 feet, 5-7 feet, 7-9 feet, 9-11 feet, 11-13 feet, 13-15 feet, 15-17 feet, 17-20 feet, 20-30 feet, a greater distance, or a combination of various listed diameters, such as being between 9-15 feet. In some embodiments, the reader 108 may be disposed above, to the side, or below the area 108. The area 108 may be on a floor, at the base of an object such as a box, pallet, or support, on a wall, on a ceiling, or in a region of space such as to the side of a reader within a room, vehicle, doorway, entrance, or hallway.

In some embodiments, the system 100 may include a scale that may be used to measure the weight of a container 106 as items are added. The scale may provide the system 100 with the capability of determining that an object was added but not detected by the reader system 102, which may also trigger an alert.

In some embodiments, the conveyor 110 that may be positioned to deliver items 112 into or onto the container 106 as it is being loaded. For example, the conveyor 110 may include a chute or conveyor belt that delivers items 112 onto or into a container 106 such as a box, Gaylord, bag, carton, pallet, tray, shipping container, or vehicle. In various embodiments, items 112 may be delivered by other systems such as by hand, by forklift, or by robot.

The notification system 114 may include one or more of lights, audible alerts from a noise emitter, and/or an electronic alert system such as email, text messages, or website posting. The lights may include a light stack having one or more colors, which may be driven by a GPIO port on the reading system 102. Different colors may be used for different notification purposes. For example, constant green may indicate a powered on status. Red may indicate an error detection. The noise emitter may include a beeper and/or siren that may be driven by the GPIO port. One or both of the lights and noise emitter may be configured to pulsate at different intervals or remain constant.

For some embodiments, the angle as measured from a center axis of a cone projecting from the reader 102 to the area 108 may be between 0-3, 3-6, 6-9, 9-12, 12-15, 15-18, 18-22, 22-26, 26-30 degrees, or wider. For example, if the angle is 30 degrees, the cone will have an angle of 60 degrees from one side to the other. For various embodiments, the angle, the distance of the reader system 102 from the area 108, and the diameter of the area 108 will be interdependent.

In some embodiments, additional reader systems 100 may be used for a single target area 108 to cover different angles for particularly difficult to read items 112. These may include proteins, liquids, metal cans, or metal items 112 that may block an RFID communication from one or more angles.

In some embodiments, multiple reader systems 100 may be established next to each other. For example, a row of reader systems 100 may be spaced at regular intervals to allow adjacent containers 106 to be filled and/or built. For example, the reader systems 100 may be spaced apart by between 1-3, 3-4, 4-5, 5-6, 6-8, 8-10, or 10-12 feet.

In some embodiments, the reader system 102 may be capable of reading at various power levels, such as between 5-50 db. In various embodiments, the range of power levels used may be between 0-5, 5-10, 10-15, 15-20, 20-25, 25-30, 30-35, 35-40, 40-45, or 45-50 db.

In some embodiments, the reader system 102 may be used to suppress RFID tags/inlays once detected and hold them in that state. This may assist with detecting new RFID tagged items 112 as they are added to the container 106.

Operation

In some embodiments, as items 112 are added to the container 106, the reading system 102 may scan for items 112. By scanning for items 112 on a continuous, periodic, or triggered basis as a container 106 is loaded, the system may avoid being prevented from detecting an RFID tagged item because of lack of line of sight to items that are at the bottom or opposite side of a group of items that are in a Gaylord, on a pallet, or part of another container 106. The system 100 may be operated in a variety of ways.

In some embodiments, the system 100 may be configured to detect items that are prohibited, such as items that may not be shipped via commercial air transport, items that have not been paid for, items that are not intended for a particular container, items that belong in another category, or items that are intended for another destination and/or end customer. If such an item 112 is detected, the system 100 may be configured to provide an alert.

In some embodiments, the system 100 may be configured to detect items that are on a list and to provide an alert if the grouped items that arrive in an area are removed before the list is completed. When an alert is triggered, the system 100 may provide a notification using the notification system 114. In some embodiments, the system 100 is configured to track and/or record the specific items that are placed onto or into the container 106.

For some embodiments that employ continuous monitoring, the system 100 may attempt to trigger passive RFID tags without interruption or on a periodic basis such as multiple times per second, every second, or periodically at a set number of seconds. The reading system 102 may listen for RFID tag responses continuously or when it attempts to trigger RFID tag responses.

By providing an immediate notification at the time and place when a prohibited item 112 is detected or when a container 106 has not been properly built or filled, the system may enable persons to immediately respond to an issue at the appropriate area 108. For example, if items are being packaged for delivery, an audible and/or visual alert may be used to let workers know to check the container 106 at the area 108 for items 112 that are prohibited, removing them, and preventing a potentially costly violation. In other scenarios, such as for food items being assembled for delivery, processing, storage, or packaging, an alert may be provided when a prohibited item 112 is detected or when collected items are being removed from the area 108 but a list of items 112 that are intended for packaging has not been completed. In other scenarios, nearby persons may be alerted when an item 112 is missing and/or needs to be added.

The alert may include using the notification system 114 to provide audible, visual, and/or electronic notifications that may allow a person to respond immediately. This may help prevent waste, disrupting customer relationships, mispackaging, misdelivering, or otherwise causing costly, time consuming, and/or customer or business partner relationship damaging errors.

In some embodiments, the container 106 may be placed within the area 108 when it is empty, partially filled, nearly completely filled, or completely filled while the reading system 102 continuously scans, periodically scans, or scans based on conditions or triggers for RFID tagged items. In various embodiments, new read events occur as items are added to the container 106, such as onto a pile of already scanned items 112.

In some embodiments, the reader system 102 may be configured to monitor a single container 106 continuously as items are added to it. For example, the time needed to fill or otherwise add items 112 to a container 106 may range from 0-1, 1-2, 2-4, 4-6, 6-10, 10-20, 20-30, 30-45, 45-60 minutes or between 0-1, 1-2, 2-3, 3-5, 5-7 hours or longer, such as over a period of days, weeks, or months.

The items 112 may include boxes containing commercial products that are being shipped to an end customer, clothing articles such as shirts, pants, jackets, dresses, food items, appliances, fast food, restaurant food, electronics, computers, tablets, machine components, materials, or other items. Exemplary food items may include sausages, chicken, sandwiches, hamburgers, steaks, sausages, pepperoni, or other items. A commercial item may be an item that is for sale or has been sold to an end customer and/or a business. Some items 112 may have metal containers that potentially make it more difficult to accomplish an RFID read.

In some embodiments, once a container 106 has been filled or built, such as by sufficiently loading a pallet or filling a Gaylord, box, bag, or carton, a forklift may be used to pick up and move the container 106 and/or to place a new container 106 into the area 108.

Figure 2:
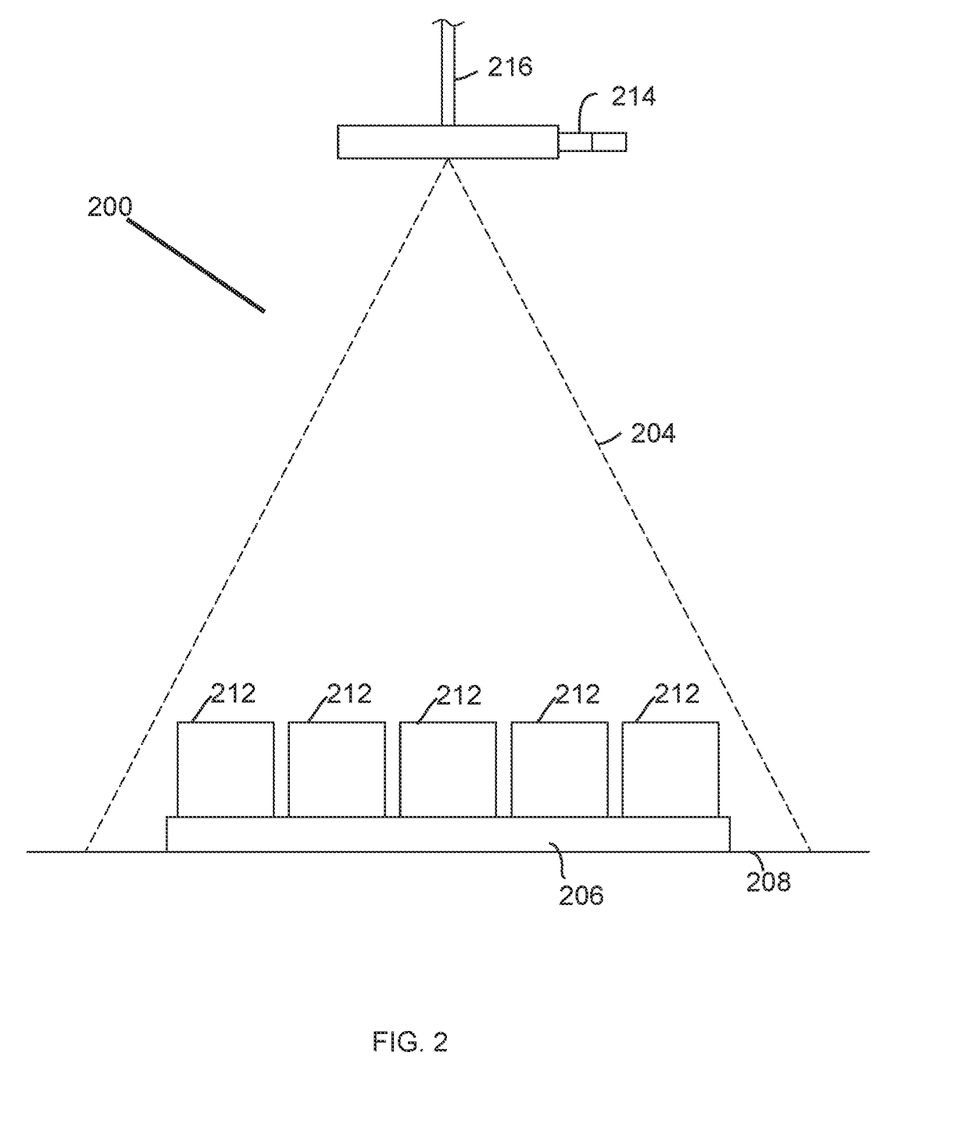
FIG. 2 is a front view of a continuous monitoring system in accordance with some embodiments.

In some embodiments, such as in FIG. 2, the system 200 may include a reading system 202, and a container 206. The system 200 may be similar to the system 100, and may be provided to illustrate that the containers 106 and 206 may be or include Gaylords, boxes, bags, pallets, trays, or other similar structures.

In some embodiments, the reading system 202 may be mounted using a pole 216 or other support, and the system may include a notification system 214 that is similar to the notification system 114. As in FIG. 1, the system 200 may continuously scan an area 208 and a region within a field 204, such as when a container 206 is positioned within the area 208 as items 212 are added to the container 206. For example, the container 206 may include a pallet.

Figure 3:
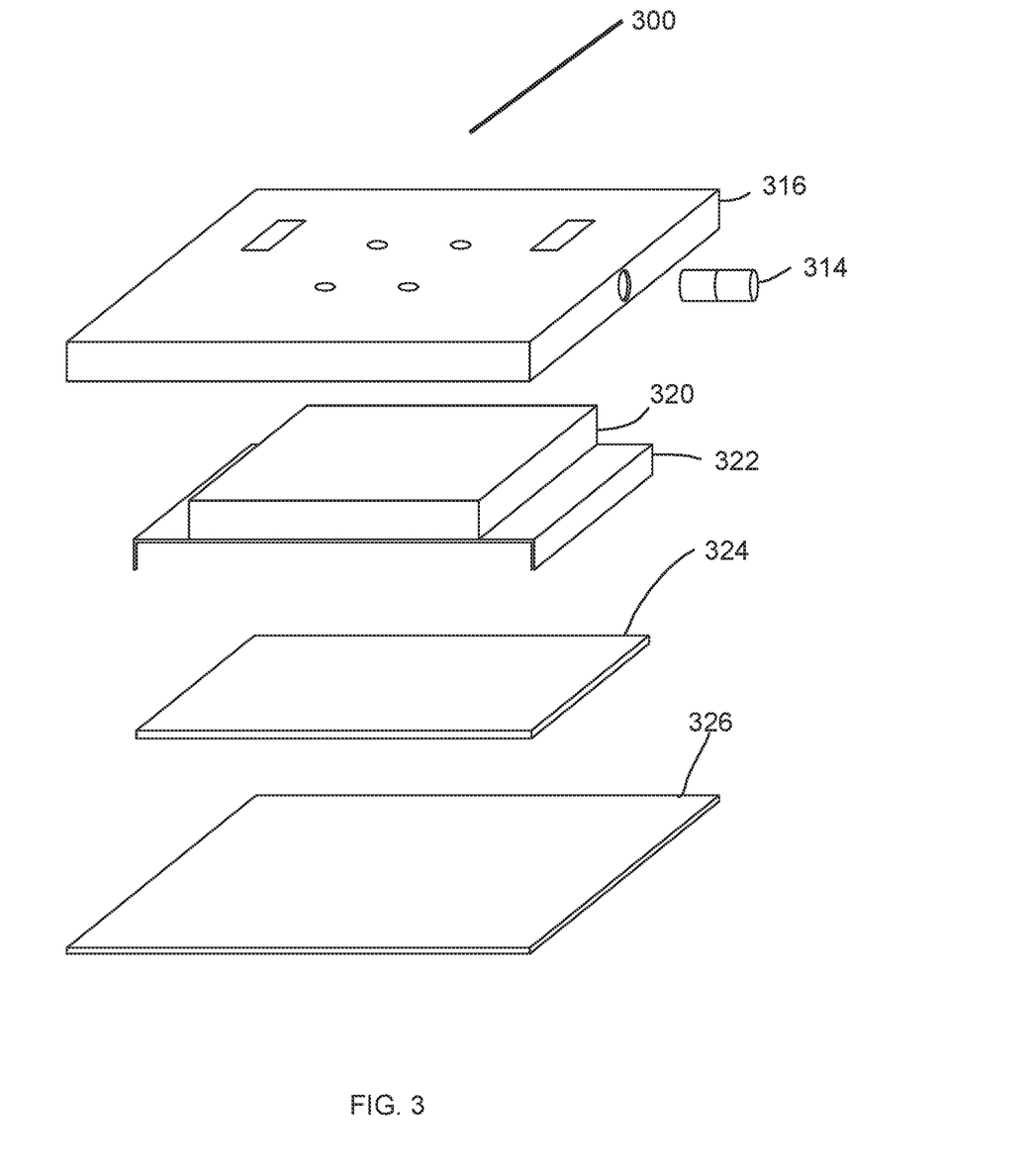
FIG. 3 is an exploded perspective view of a continuous monitoring system in accordance with some embodiments.

In some embodiments, such as in FIG. 3, a reading system 302 may include one or more of a primary enclosure 316, a notification system 314, an RFID reader 320, a reader mounting plate 322, an antenna 324, and a cover plate 326. In various embodiments, the primary enclosure 316 and the reader mounting plate may be designed to support the RFID reader 320 and the antenna 324.

In some embodiments, the side walls of the primary enclosure 316 may help confine and shape the field 104 or area 108, preventing RFID tags from outside the field from being energized by the RFID reader 320 and/or preventing signals from those RFID tags that are outside of the field 104 or area 108 from being received by the RFID reader 320. The cover plate 326 may be made from a material that allows signals to be transmitted and received by the RFID reader 320, such as plastic.

The cover plate 326 may help protect the antenna 324, which may be mounted to an upper surface of the cover plate 326. In some embodiments, when the cover plate is mounted to the primary enclosure 316, the antenna 324 is disposed inside the primary enclosure 316.

In some embodiments, the antenna 324 may be cabled to an antenna port on the reader before encapsulation. The RFID reader 320 may be powered by Power Over Ethernet (POE), AC power, or battery power.

In some embodiments, an on-board application may be used to control the RFID reader 320. In some embodiments, a computer connected to the RFID reader 320 via network connection or direct cable connection controls the RFID reader's 320 operation. Having the application resident in the RFID reader 320 may provide benefits with respect to independence from network conditions and IT infrastructure. For some embodiments, the RFID reader 320 may be connected via a network for purposes of communicating to a server or PC to assist with monitoring a pallet build, items moving past the RFID reader 320, or items being deposited into a container 106. In such instances, software for tabulating the detected RFID items with respect to data points such as identity, quantity, and time of detection may reside on the RFID reader 320 or may operate on a remote PC or server.

Figure 4A:
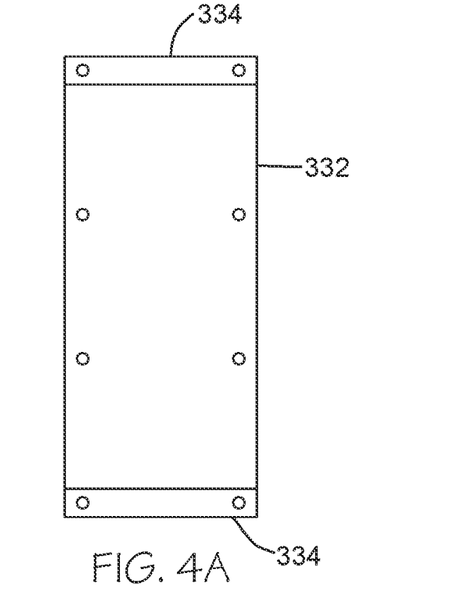
FIGS. 4A-4B are plan views of various components of a continuous monitoring system in accordance with some embodiments.

In some embodiments, such as in FIG. 4A, the mounting plate 322 may include a support 332 and side walls 334. The support 332 may be designed to support the RFID reader 320. The side walls 334 may be designed to be mounted to the primary enclosure 316.

Figure 4B:
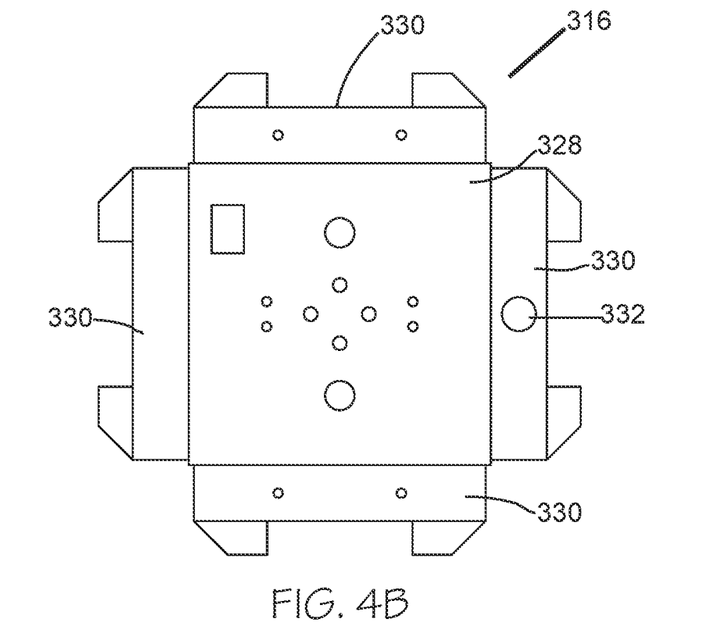
Figure 5:
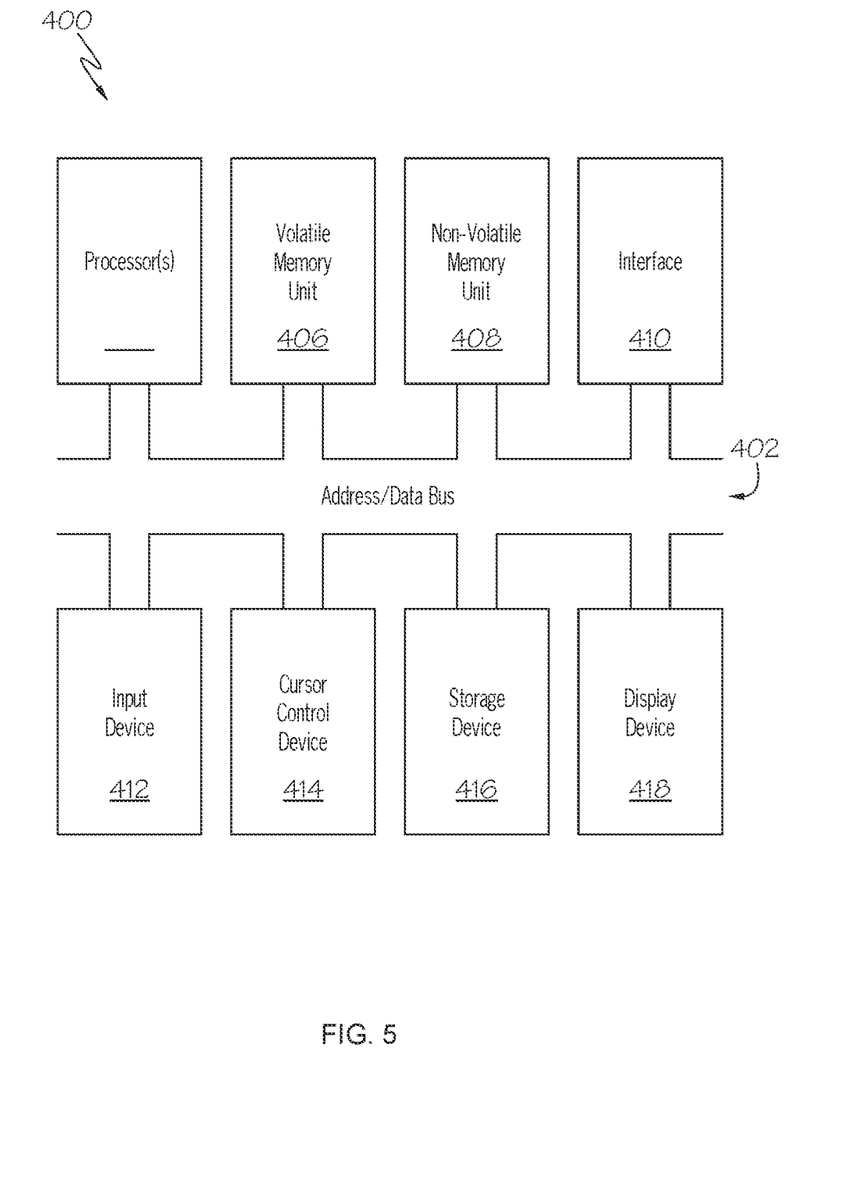
FIG. 5 is a block diagram of an exemplary computer system in accordance with some embodiments.

In some embodiments, such as in FIG. 4B, the primary enclosure 316 may include a top panel 328, and side walls 330. The top panel 328 may be configured to enable mounting of the monitoring system 100 to a supporting structure, such as a pole, ceiling, wall, frame, scaffold, or other supporting structure.

Exemplary Computer System

Figure 6:
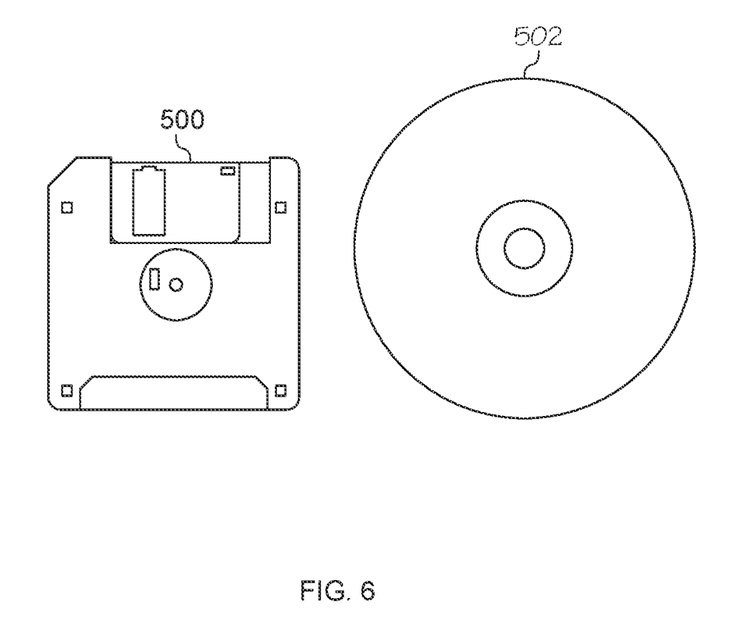
FIG. 6 are illustrative diagrams of computer program products in accordance with some embodiments.

A block diagram depicting an example of a system (i.e., computer system 400) that may be used to process signals and/or perform operations described in this disclosure is provided in FIG. 6. The computer system 400 is configured to perform calculations, processes, operations, and/or functions associated with a program or algorithm. In one aspect, certain processes and steps discussed herein are realized as a series of instructions (e.g., software program) that reside within computer readable memory units and are executed by one or more processors of the computer system 400. When executed, the instructions cause the computer system 400 to perform specific actions and exhibit specific behavior, such as described herein.

The computer system 400 may include an address/data bus 402 that is configured to communicate information. Additionally, one or more data processing units, such as a processor 404 (or processors), are coupled with the address/data bus 402. The processor 404 is configured to process information and instructions. In an aspect, the processor 404 is a microprocessor. Alternatively, the processor 404 may be a different type of processor such as a parallel processor, application-specific integrated circuit (ASIC), programmable logic array (PLA), complex programmable logic device (CPLD), or a field programmable gate array (FPGA).

The computer system 400 is configured to utilize one or more data storage units. The computer system 400 may include a volatile memory unit 406 (e.g., random access memory ("RAM"), static RAM, dynamic RAM, etc.) coupled with the address/data bus 402, wherein a volatile memory unit 406 is configured to store information and instructions for the processor 404. The computer system 400 further may include a non-volatile memory unit 408 (e.g., read-only memory ("ROM"), programmable ROM ("PROM"), erasable programmable ROM ("EPROM"), electrically erasable programmable ROM "EEPROM"), flash memory, etc.) coupled with the address/data bus 402, wherein the non-volatile memory unit 408 is configured to store static information and instructions for the processor 404. Alternatively, the computer system 400 may execute instructions retrieved from an online data storage unit such as in "Cloud" computing. In an aspect, the computer system 400 also may include one or more interfaces, such as an interface 410, coupled with the address/data bus 402. The one or more interfaces are configured to enable the computer system 400 to interface with other electronic devices and computer systems. The communication interfaces implemented by the one or more interfaces may include wireline (e.g., serial cables, modems, network adaptors, etc.) and/or wireless (e.g., wireless modems, wireless network adaptors, etc.) communication technology.

In one aspect, the computer system 400 may include an input device 412 coupled with the address/data bus 402, wherein the input device 412 is configured to communicate information and command selections to the processor 100. In accordance with one aspect, the input device 412 is an alphanumeric input device, such as a keyboard, that may include alphanumeric and/or function keys. Alternatively, the input device 412 may be an input device other than an alphanumeric input device. In an aspect, the computer system 400 may include a cursor control device 414 coupled with the address/data bus 402, wherein the cursor control device 414 is configured to communicate user input information and/or command selections to the processor 100. In an aspect, the cursor control device 414 is implemented using a device such as a mouse, a track-ball, a track-pad, an optical tracking device, or a touch screen. The foregoing notwithstanding, in an aspect, the cursor control device 414 is directed and/or activated via input from the input device 412, such as in response to the use of special keys and key sequence commands associated with the input device 412. In an alternative aspect, the cursor control device 414 is configured to be directed or guided by voice commands.

In an aspect, the computer system 400 further may include one or more optional computer usable data storage devices, such as a storage device 416, coupled with the address/data bus 402. The storage device 416 is configured to store information and/or computer executable instructions. In one aspect, the storage device 416 is a storage device such as a magnetic or optical disk drive (e.g., hard disk drive ("HDD"), floppy diskette, compact disk read only memory ("CD-ROM"), digital versatile disk ("DVD")). Pursuant to one aspect, a display device 418 is coupled with the address/data bus 402, wherein the display device 418 is configured to display video and/or graphics. In an aspect, the display device 418 may include a cathode ray tube ("CRT"), liquid crystal display ("LCD"), field emission display ("FED"), Light Emitting Diode ("LED)", plasma display, or any other display device suitable for displaying video and/or graphic images and alphanumeric characters recognizable to a user.

The computer system 400 presented herein is an example computing environment in accordance with an aspect. However, the non-limiting example of the computer system 400 is not strictly limited to being a computer system. For example, an aspect provides that the computer system 400 represents a type of data processing analysis that may be used in accordance with various aspects described herein. Moreover, other computing systems may also be implemented. Indeed, the spirit and scope of the present technology is not limited to any single data processing environment. Thus, in an aspect, one or more operations of various aspects of the present technology are controlled or implemented using computer-executable instructions, such as program modules, being executed by a computer. In one implementation, such program modules include routines, programs, objects, components and/or data structures that are configured to perform particular tasks or implement particular abstract data types. In addition, an aspect provides that one or more aspects of the present technology are implemented by utilizing one or more distributed computing environments, such as where tasks are performed by remote processing devices that are linked through a communications network, or such as where various program modules are located in both local and remote computer-storage media including memory-storage devices.

An illustrative diagram of a computer program product (i.e., storage device) is depicted in FIG. 6. The computer program product is depicted as floppy disk 500 or an optical disk 502 such as a CD or DVD. However, as mentioned previously, the computer program product generally represents computer-readable instructions stored on any compatible non-transitory computer-readable medium. The term "instructions" as used with respect to this invention generally indicates a set of operations to be performed on a computer, and may represent pieces of a whole program or individual, separable, software modules. Non-limiting examples of "instruction" include computer program code (source or object code) and "hard-coded" electronics (i.e. computer operations coded into a computer chip). The "instruction" is stored on any non-transitory computer-readable medium, such as in the memory of a computer or on a floppy disk, a CD-ROM, and a flash drive. In either event, the instructions are encoded on a non-transitory computer-readable medium.

What has been described above includes examples of the claimed subject matter. It may be, of course, not possible to describe every conceivable combination of components or methodologies for purposes of describing the claimed subject matter, but one of ordinary skill in the art may recognize that many further combinations and permutations of the claimed subject matter are possible. Accordingly, the claimed subject matter may be intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A monitoring system, comprising:
    a Radio Frequency Identification (RFID) reader mounted to a supporting wall or ceiling of a room,
    wherein the RFID reader is configured for continuously scanning for RFID tagged items within a target area that is between 4 and 10 feet wide at its widest dimension at a distance of at least 5 feet from the RFID reader, and wherein the RFID reader is further configured to scan continuously as the RFID tagged items are added to a container in the target area to be collected for shipment prior to sale, and
    wherein the RFID reader is further configured to detect items prohibited for transportation by air and further configured to issue at least one of an audible or a visual alert when a prohibited item is detected to permit removal of the prohibited item before transport, and
    wherein the RFID tagged items comprise a box containing a commercial product that has not yet been sold to a consumer.

2. The monitoring system of claim 1, further comprising a conveyor disposed to deliver items into the container.

3. The monitoring system of claim 1, wherein the container is one of a Gaylord, a pallet, a box, or a bag.

4. The monitoring system of claim 1, wherein the RFID tagged items are further each one of the following: an appliance, a machine component, and materials.

5. A method of operating a monitoring system, comprising:
    using a Radio Frequency Identification (RFID) reader mounted to a supporting wall or ceiling of a room,
    wherein the RFID reader is configured for continuously scanning for RFID tagged items within a target area that is between 4 and 10 feet wide at its widest dimension at a distance of at least 5 feet from the RFID reader, and wherein the RFID reader is further configured to scan continuously as the RFID tagged items are added to a container in the target area to be collected for shipment prior to sale to a consumer, and
    wherein the RFID reader is further configured to detect items prohibited for transportation by air and further configured to issue at least one of an audible or a visual alert when a prohibited item is detected to permit removal of the prohibited item before transport, and
    wherein the RFID tagged items comprise a box containing a commercial product that has not yet been sold to a consumer.

6. The method of claim 5, wherein the RFID tagged items are further each one of the following: an appliance, a machine component, and materials.

7. The method of claim 5, further comprising:
    using a conveyor, delivering items into the container.

8. The method of claim 5, wherein the container is one of a Gaylord, a pallet, a box, or a bag.

* * * * *